US009128732B2

(12) United States Patent
Hunt et al.

(10) Patent No.: US 9,128,732 B2
(45) Date of Patent: Sep. 8, 2015

(54) SELECTIVE RANDOMIZATION FOR NON-DETERMINISTICALLY COMPILED CODE

(75) Inventors: Oliver J. Hunt, San Francisco, CA (US); Gavin Barraclough, Santa Clara, CA (US); Filip J. Pizlo, Capitola, CA (US); Geoffrey Garen, San Jose, CA (US)

(73) Assignee: Apple Inc., Cupertino, CA (US)

( * ) Notice: Subject to any disclaimer, the term of this patent is extended or adjusted under 35 U.S.C. 154(b) by 269 days.

(21) Appl. No.: 13/619,814

(22) Filed: Sep. 14, 2012

(65) Prior Publication Data

US 2013/0205388 A1    Aug. 8, 2013

Related U.S. Application Data

(60) Provisional application No. 61/594,983, filed on Feb. 3, 2012, provisional application No. 61/599,309, filed on Feb. 15, 2012.

(51) Int. Cl.
*G06F 9/45* (2006.01)
*G06F 11/00* (2006.01)
*G06F 11/36* (2006.01)
*G06F 9/455* (2006.01)

(52) U.S. Cl.
CPC .............. *G06F 8/443* (2013.01); *G06F 8/447* (2013.01); *G06F 9/45516* (2013.01); *G06F 11/3612* (2013.01); *G06F 8/4441* (2013.01)

(58) Field of Classification Search
CPC ..... G06F 8/443; G06F 8/447; G06F 9/45516; G06F 11/3612; G06F 21/36

USPC .............................................. 717/159; 726/22
See application file for complete search history.

(56) References Cited

U.S. PATENT DOCUMENTS

| 5,940,618 | A | 8/1999 | Blandy et al. |
| 6,003,123 | A | 12/1999 | Carter et al. |
| 7,107,430 | B2 | 9/2006 | Grossman et al. |
| 7,171,693 | B2 | 1/2007 | Tucker et al. |
| 7,181,580 | B2 | 2/2007 | Erickson et al. |

(Continued)

FOREIGN PATENT DOCUMENTS

| WO | WO 2011/049553 A1 | 4/2011 |
| WO | WO 2012/015671 A1 | 2/2012 |

OTHER PUBLICATIONS

International Search Report and Written Opinion of the International Searching Authority, mailing date May 6, 2013, for corresponding International Application No. PCT/US2013/024193, 12 pages.

(Continued)

*Primary Examiner* — Ryan Coyer
(74) *Attorney, Agent, or Firm* — Blakely, Sokoloff, Taylor & Zafman LLP

(57) ABSTRACT

A method and an apparatus for runtime compilation that generates non-deterministic and unpredictable code to protect against un-trusted code attacks are described. The runtime compilation may be based on heuristic rules without requiring deterministic behavior reduction operations for all the code generated. The heuristic rules may include estimations on, for example, runtime overhead or cost incurred for code protection, amount of code protection required and/or other applicable factors and their relationships.

23 Claims, 6 Drawing Sheets

(56) References Cited

U.S. PATENT DOCUMENTS

| | | | |
|---|---|---|---|
| 7,366,914 | B2 | 4/2008 | Graunke |
| 7,804,503 | B2 | 9/2010 | Fernandez et al. |
| 7,840,950 | B2 | 11/2010 | Stoodley et al. |
| 7,996,671 | B2 | 8/2011 | Chheda et al. |
| 2003/0126590 | A1 | 7/2003 | Burrows et al. |
| 2007/0061790 | A1 | 3/2007 | Kay et al. |
| 2008/0127142 | A1* | 5/2008 | Wrighton et al. ............ 717/148 |
| 2009/0019458 | A1 | 1/2009 | Katari et al. |
| 2010/0095284 | A1 | 4/2010 | Herring et al. |
| 2011/0314452 | A1 | 12/2011 | Tillmann |
| 2012/0030653 | A1 | 2/2012 | Porras et al. |
| 2013/0014275 | A1* | 1/2013 | Goodes et al. ................. 726/26 |
| 2013/0024939 | A1* | 1/2013 | Glew et al. ..................... 726/24 |

OTHER PUBLICATIONS

Agesen et al., "Type Feedback vs. Concrete Type Intereference: A Comparison of Optimization Techniques for Object-Oriented Languages", Oct. 30, 1995, pp. 91-107, vol. 30, No. 10, New York, New York.

Arnold et al., "A Framework for Reducing the Cost of Instrumented Code", 2001 ACM Sigplan Conference on Programming Language Design and Implementation (PLDI '01), Jun. 20-22, 2001, 12 pages, Snowbird, Utah.

Bala, Vasanth et al., "Dynamo: a transparent dynamic optimization system," Proceeding PLDI '00, Proceedings of the ACM SIGPLAN 2000 conference on Programming language design and implementation, May 2000, 12 pages.

PCT International Search Report and Written Opinion for corresponding International Application No. PCT/US2013/024198, mailing date Jun. 13, 2013, 14 pages.

Gal, Andreas et al., "Trace-based Just-in-Time Type Specialization for Dynamic Languages," Proceedings of the 2009 ACM Sigplan Conference on Programming Language Design and Implementation, Jun. 15, 2009, vol. 44, pp. 465-478.

Wingo, A, "JavaScriptCore, the WebKit JS implementation," Oct. 28, 2011, pp. 1-12, http://wingolog.org/archives/2011/10/28/javascriptcore-the-webkit-js-implementation.

Chambers, Craig et al., "An Efficient Implementation of SELF, A Dynamically-Typed Object-Oriented Language Based on Prototypes", Proceedings of the Object Oriented Programming Systems Languages and Applications Conference. (OOPSLA). New Orleans, Oct. 1-6, 1989, vol. 24, No. 10, pp. 49-70.

PCT International Preliminary Report on Patentability for PCT/US2013/024193, mailed Aug. 14, 2014.

PCT International Preliminary Report on Patentability for PCT/US2013/024198, mailed Aug. 14, 2014.

* cited by examiner

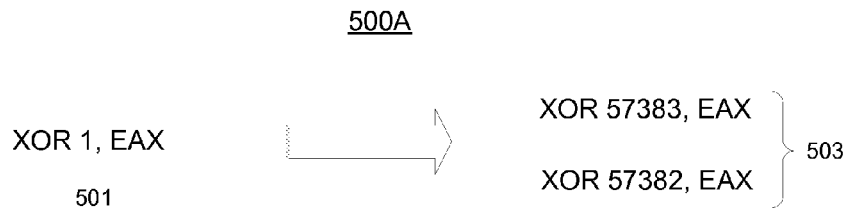

500A

XOR 1, EAX        ⟶        XOR 57383, EAX
                                             } 503
501                        XOR 57382, EAX

Fig. 5A

```
trustedBytes = 0
untrustedBytes = 0;                                          500B
for each generated value b:
    if (b is trusted)
509 ─▶  emit(b);
        trustedBytes = trustedBytes + 1;
        continue;
    if (not shouldHardenUntrustedValue(b))
        emit(b);
        untrustedBytes = untrustedBytes + 1;
        continue;
511 ─▶ emitHardenedValue(b);
513 ─▶ untrustedBytes = decayUntrustedByteCount(untrustedByteCount);

function shouldHardenUntrustedValue(b)
    if (b is a safe value)
        return false;
505 ─▶  proportionOfUntrustedContent = untrustedBytes / trustedBytes;
507 ─▶      if (proportionOfUntrustedContent < randomNumber() * EnviromentSafetyHeuristic)
            return false;
        return true;
```

Fig. 5B

SELECTIVE RANDOMIZATION FOR NON-DETERMINISTICALLY COMPILED CODE

CROSS-REFERENCE TO RELATED APPLICATIONS

This application is related to, and claims the benefits of, U.S. Provisional Patent Application No. 61/594,983, filed Feb. 3, 2012, entitled "RUNTIME COMPILATION FOR DYNAMIC PROGRAMMING LANGUAGES", by Filip Pizlo et al., U.S. Provisional Patent Application No. 61/599,309, filed Feb. 15, 2012, entitled "RUNTIME COMPILATION FOR DYNAMIC PROGRAMMING LANGUAGES", by Filip Pizlo et al., both of which are hereby incorporated by reference herein in their entirety.

FIELD OF INVENTION

The present invention relates generally to computer security. More particularly, this invention relates to generating non-deterministically compiled code via selective randomization to protect against un-trusted code execution.

BACKGROUND

Dynamic languages that lack type annotations of any kind are increasingly popular. For example, JavaScript has become the lingua franca of the World Wide Web, while Ruby, Python, Perl, and PHP have become standard languages for server-side infrastructure. However, runtime of dynamic language based code may require significant overhead as optimal compilation strategies may not be available to compile the code.

For example, JavaScript does not allow a program to specify type of variable. Thus, during runtime, a variable may be dynamically converted into separate types in different execution paths. Such conversions may be computationally expensive with high impact of overall performance. Further, dynamically created data types may require significant lookup or search operations among indexed data structures, such as dictionaries, to assign a type to a data or to access property of data of a certain type.

Furthermore, modern JavaScript engines are required to execute un-trusted code very quickly, and for this reason use runtime code generation through mechanisms such as Just In Time (JIT) compilation, which may be used by an attacker to bypass OS/hardware protection. Existing protection techniques, such as constant blinding, may be adopted to block such attacks. However, these techniques may incur performance costs, both in terms of memory use and processor execution time, on a target code regardless of the risk of the target code being executed.

Therefore, traditional non-deterministic runtime compilation approaches tend to be costly, inefficient and non-optimized.

SUMMARY OF THE DESCRIPTION

In one embodiment, runtime compilation, such as JIT compilation, may generate non-deterministic and unpredictable code to protect against un-trusted code attacks, such as JIT SPRAY attacks, based on heuristic rules without requiring deterministic behavior reduction operations for all the code generated. The heuristic rules may include estimations on, for example, cost (e.g. runtime overhead) of code protection incurred, amount of code protection required and/or other applicable factors and their relationships.

In one embodiment, a figure (or measurement) is dynamically collected or accumulated for estimating how trustworthy a state of a source code is when performing runtime compilation of the source code. The figure may be based on tracking an amount of emitted code (e.g. how many bytes already generated) from the source code and an amount of un-trusted control over the emitted code. For example, the figure may determine (unpredictably) whether to blind (or mangle, randomize) a constant of the source code for the compiled code to defend against potential un-trusted executable code embedded in the constant.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIGS. 5A-5B illustrate examples of just-in-time compilation with scattered randomization operations according to certain embodiments described herein;

DETAILED DESCRIPTION

Methods and apparatuses for a runtime compiler are described herein. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

Figure 1:
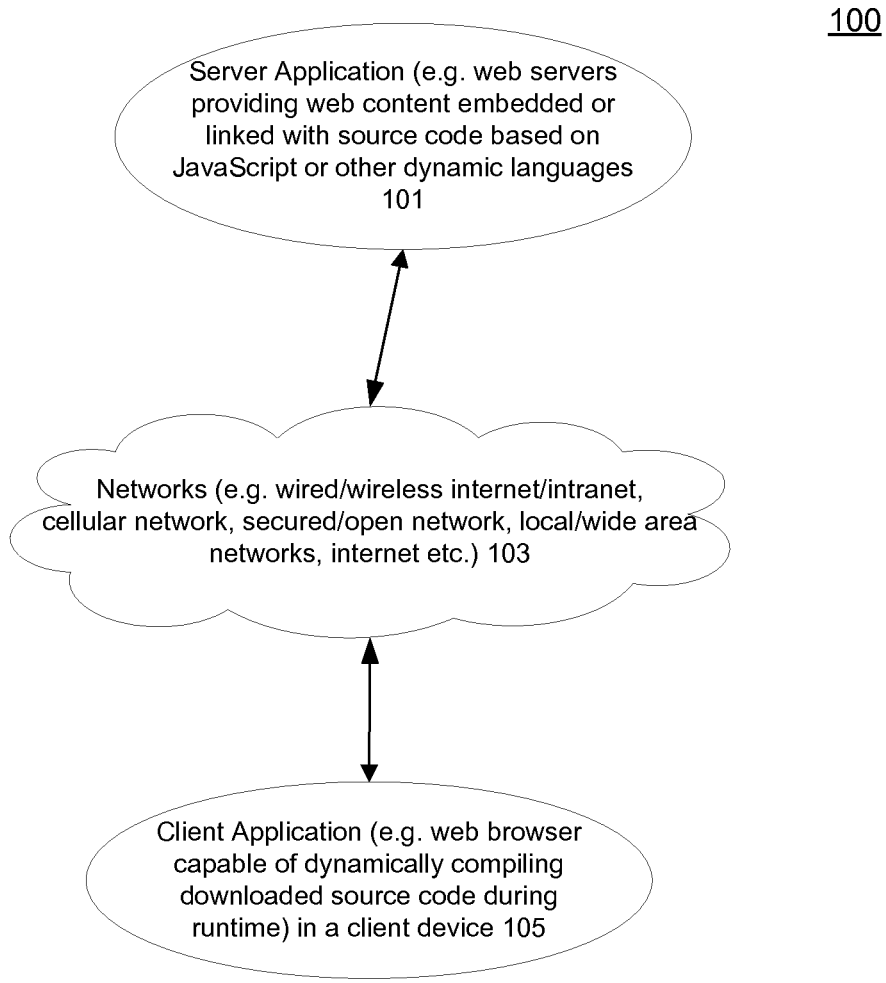
FIG. 1 is a network diagram illustrating an exemplary runtime compilation for source code retrieved from networked devices.

FIG. 1 is a network diagram illustrating an exemplary runtime compilation for source code retrieved from networked devices. In one embodiment, network system 100 may include one or more server application 101, such as web server, hosted in one or more server devices to provide content available for client application 105, such as web browser, running in a client device. Server 101 and client 105 may communicate with each other via network 103 based on, for example, internet protocols such as HTTP (Hypertext Transport Protocol) or other applicable protocols.

In one embodiment, content retrieved from server 101 may include web pages based on hypertext languages, such as HTML (Hypertext Markup Language) or other markup language, embedded or linked (e.g. hyperlinked) with sources in a dynamic programming language, such as ECMAScript (Standard ECMA-262, ECMAScript Language Specification, Edition 5.1, June 2011). JavaScript may represent one implementation of ECMAScript language. Client 105 may dynamically download or fetch the linked sources for execution. In one embodiment, client 105 may dynamically compile the downloaded sources during runtime to improve execution performance.

Figure 2:
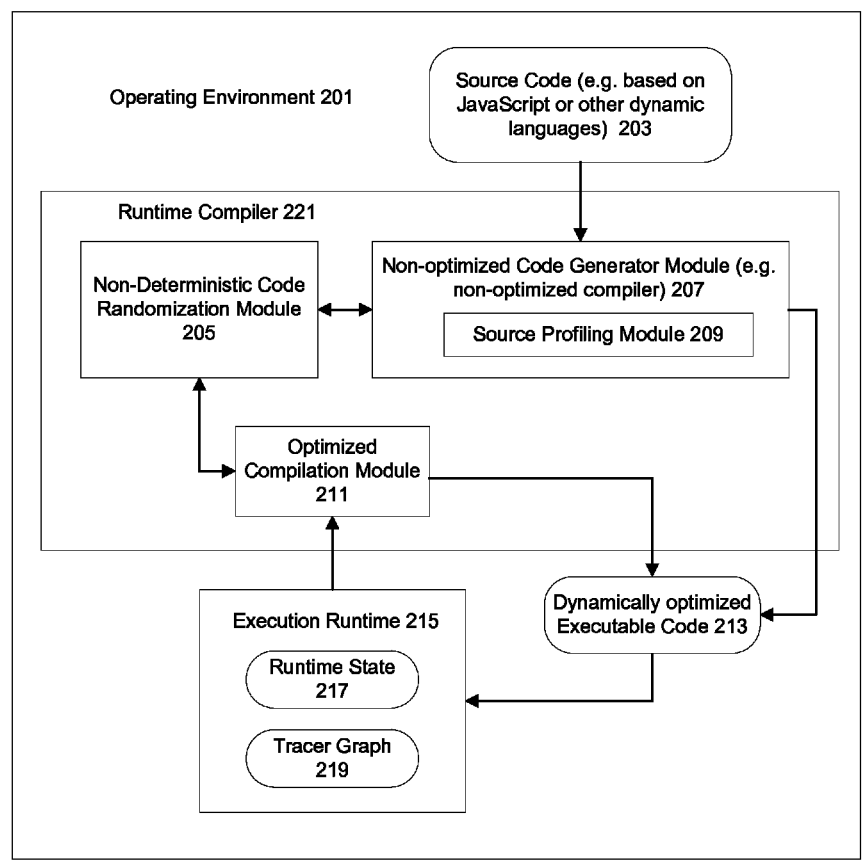
FIG. 2 is a block diagram illustrating one embodiment of a system for runtime compilation of dynamic programming languages.

FIG. 2 is a block diagram illustrating one embodiment of a system for runtime compilation of dynamic programming languages. In one embodiment, system 200 may include operating environment 201, such as an operating system hosting client application 101 of FIG. 1. Operating environment 201 may include runtime compiler 221 dynamically compiling source code 203 into executable code 213. Source code 203 may comprise programs in a dynamic programming language, such as ECMAScript. In one embodiment, source code 203 may be retrieved from a remote device, such as server 101 of FIG. 1, by a browser application running in operating environment 201. Both runtime compiler 221 and execution runtime 215 may be controlled by the browser application to perform browsing operations.

In one embodiment, runtime compiler 221 may include non-optimized code generator module 207 to compile source code 203. Module 207 may include source profiling module 209 to generate profiling information (e.g. code location identifiers, token keys, or other statically analyzed code data etc.) from source code 203. According to some embodiments, module 207 may provide an initial version of executable code 213 which is to be dynamically updated and optimized during runtime via optimized compilation module 211.

For example, execution runtime 215 may execute executable code 213 to collect tracer graph 219 which provides runtime statistics for optimized compilation module 211 to perform optimization operations (e.g. data type conversions, code replacements, etc.) on executable code 213. Execution runtime 215 can dynamically maintain runtime state 217 including, for example, data instances (e.g. objects or other data structures) created for executing source code 203. Runtime compiler 221 may include non-deterministic code randomization module 205 to introduce unpredictability between source code 203 and executable code 213 to protect against executing potential hidden executable code embedded inside source code 203.

Runtime compiler 221 may include non-deterministic code randomization module 205 to introduce unpredictability between source code 203 and executable code 213 to protect against executing potential hidden executable code embedded inside source code 203.

Selective Randomization for Non-Deterministically Compiled Code

Runtime compiler (such as JIT compiler) may selectively and randomly introduce nondeterministic elements to generate an unpredictable compiled code for a source code (e.g. a ECMAScript code remotely fetched) to protect against potential execution of un-trusted code embedded inside the source code. Separate compilations on a common source code by the runtime compiler may result in different unpredictable compiled codes without predictability between each other. The runtime compiler may be configured to vary degrees of protection (or randomness) desired and amount of overhead incurred in the unpredictable compiled code. For example, nondeterministic elements may be selectively applied randomly at different portions of a compiled code based on non-deterministic decisions. Thus, possible deterministic behavior of a code generator in the runtime compiler may be reduced.

In one embodiment, a runtime compiler may heuristically morph machine instructions of a regular compiled code in a random manner (e.g. a random spray manner) to generate an unpredictable compiled code. Heuristic evaluations may be dynamically applied to non-deterministically decide whether to introduce unpredictability at different portions of the regular compiled code of a source code. In one embodiment, heuristic evaluations may assign an amount of trustworthiness to a block of code based on static or dynamic measures or analysis of the source code as it is being compiled.

For example, each unit of code (e.g. a value, a constant etc.) compiled from a source code may be designated as either trusted or un-trusted. Total sizes of trusted code (e.g. number of bytes or machine instructions) and un-trusted code may be dynamically maintained to provide a heuristic measure of a ratio between trusted code and un-trusted code encountered at some point in time during compilation. Optionally or additionally, heuristic measures may include number of function block codes (or functions) which have already been emitted (e.g. generated as part of unpredictable compiled code), size of a function block code, or other applicable measures. Typically, the larger in size a function block code is, the less likely the function block code can be trusted. Similarly, the more functions a source code includes, the less trust it may be ascribed to.

In one embodiment, heuristic measures of trustworthiness for a code (e.g. a block of compiled code) may be combined to determine whether to perform randomization operations on the code as part of unpredictable compiled code. The determination may be based on outcome of a random function. The behavior of the random function may result in less likelihood to perform the randomization operations in proportion to amount of trust estimated based on the heuristic measures. The random function may provide non-deterministic properties or unpredictability in an unpredictable compiled code. For example, the portions of the regular compiled code to be randomized may be unpredictable according to the random function.

In some embodiments, a proportion of un-trusted bytes that have been emitted in a given instruction stream may be tracked during JIT compilation. The proportion may be used as a weighting factor to decide whether to apply randomization operations to protect the generated code. This decision may be made on the basis of a set of heuristics that may be varied per-environment depending on the degree to which the environment is susceptible to these attacks, and the output of a random process. Any deterministic factor in selecting which portions of the code to apply randomization operations (or hardening points) may be prevented.

Exemplary randomization operations may include NOP (no op) padding operations, randomized instruction selections, constant blinding operations, other applicable code randomization operations or combinations of code randomization operations and normal operations. NOP padding operations may be performed (e.g. via a code generator of a runtime compiler) to randomly generate instructions that have no effect on execution other than to change the spacing between instructions. For example, one or more machine instructions that have no effect may be planted into the instruction stream so that the distance (e.g. of instruction positions within the executable code) between attacker controlled constants is unpredictable.

Randomized instruction selection operations can make use of the fact that many instructions may be encoded differently, or be substituted with other instructions that have the same result (e.g. subtracting a positive constant vs adding a negative constant). Constant blinding operations may be performed to replace a constant (e.g. used by a attacker) with another constant that was generated by a reversible operation, followed by code to reverse the transformation. For example, operation a=b+5 may be converted to a=b+3+2, or a=b++7−2 or a=b−−5 or a=b+(8^13) or a=b+(20>>2) or a=(b*10−50)/10 etc.

Alternatively or additionally, randomized instruction selections may include instruction re-ordering. In some platforms, multiple instructions may be required to load a large constant. For example, register0=0xffffffff may be implemented as

```
mov register0, 0xffff // to set register0 to 0xffff
orhi register0, 0xffff // to logically load 0xffff into the top half of
                      // register0, such that register0 contains the value
                      // 0xffffffff
```

There can be numerous ways or mechanisms to perform randomization operations to introduce non-determinism into code generator. These mechanisms may be dynamically selected during run time in a non-deterministic manner.

Selective randomization in a runtime compiler may effectively block attacker's attempt to execute an un-trusted code embedded inside a source code (e.g. a JIT Spray attack) while at the same time limit resource overhead incurred (e.g. in code size, total runtime and/or memory space required). Although selective randomization may apply randomization operations (e.g. constant blinding operations) to a certain subset of code (e.g. certain constants instead of all constants of the code), the randomness and unpredictability introduced in the emitted compiled code can prevent practical attacks, such as JIT Spray attacks or other attacks. For example, the code generator may not be forced to produce instructions to be interpreted by a processor as the attacker expects.

Figure 3:
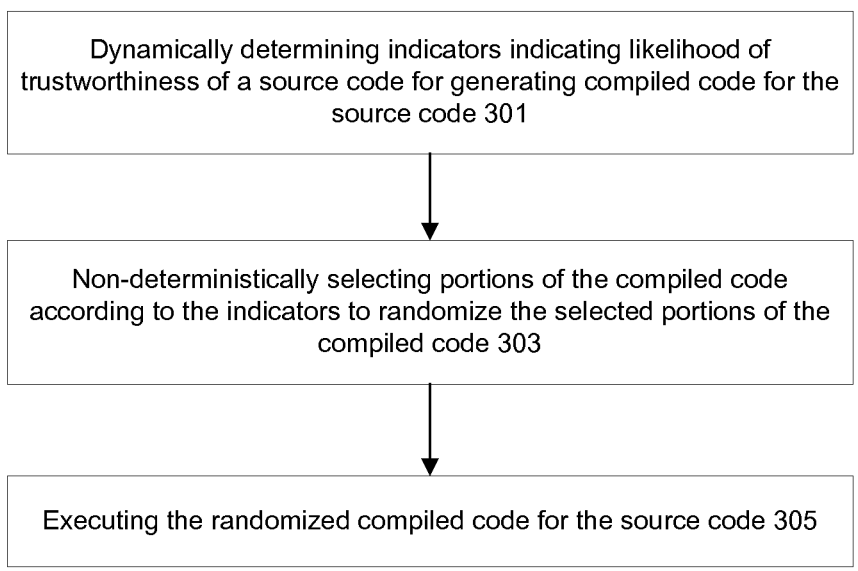
FIG. 3 is a flow diagram illustrating one embodiment of a process to selectively randomize a compiled code from a source code in a non-deterministic manner.

FIG. 3 is a flow diagram illustrating one embodiment of a process to selectively randomize a compiled code from a source code in a non-deterministic manner. Exemplary process 300 may be performed by a processing logic that may include hardware, software or a combination of both. For example, process 300 may be performed by some components of system 200 of FIG. 2. At block 301, the processing logic of process 300 may dynamically determine heuristic indicators indicating likelihood of trustworthiness of a source code for generating compiled code for the source code. A heuristic indicator may indicate whether a portion of a code (e.g. a value created in the code) is trusted or not, amount of trusted code, amount of un-trusted code, relative size between trust and un-trusted code, total size of a function block of code, heuristic environmental settings, or other applicable heuristic estimation.

At block 303, the processing logic of process 300 may non-deterministically select portions of a compiled code according to heuristic indicators. The processing logic of process 300 may randomize the selected portions of the compiled code to introduce unpredictability to the randomized compiled code without incurring execution cost in unselected portions of the compiled code which are not randomized. The randomized compiled code for a source code may not be predicted from a separate compiled code of the source code. At block 305, the processing logic of process 300 may execute the randomized compile code compiled from a source code without executing potential un-trusted code embedded inside the source code.

Figure 4:
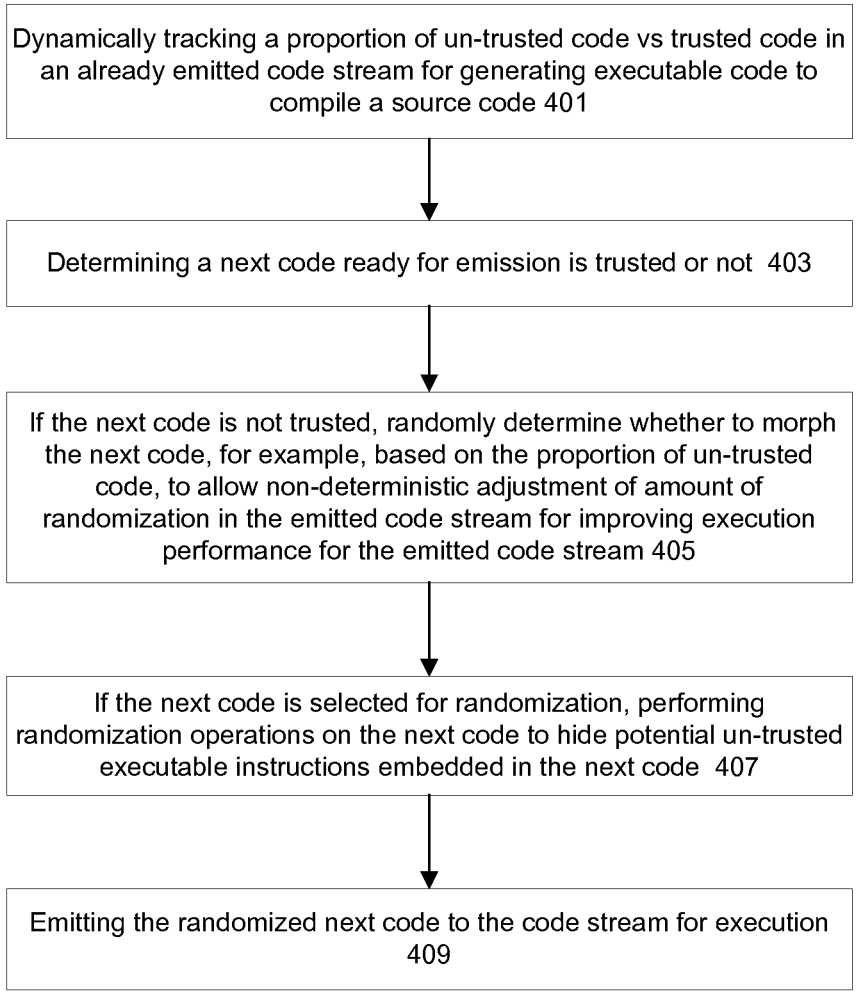
FIG. 4 is a flow diagram illustrating one embodiment of a process to emit executable code non-deterministically randomized from a compiled code stream of a source code.

FIG. 4 is a flow diagram illustrating one embodiment of a process to emit executable code non-deterministically randomized from a compiled code stream of a source code. Exemplary process 400 may be performed by a processing logic that may include hardware, software or a combination of both. For example, process 400 may be performed by some components of system 200 of FIG. 2. At block 401, in one embodiment, the processing logic of process 400 may dynamically track a proportion of un-trusted code vs. trusted code in an already emitted code stream (e.g. to emit a next code to the code stream) for generating executable code. The processing logic of process 400 may compile a source code (e.g. a ECMAScript code) to the executable code during runtime.

At block 403, the processing logic of process 400 may determine if a next code ready for emission is a trusted or not. For example, the next code may be a code block (e.g. an instruction) next to an already emitted code stream in a compiled code. The next code may not be trusted, for example, with a value or constant created or specified from a source code which is not trusted (received or retrieved from an unverified source). Alternatively a value created or controlled by a compiler, such as a built in constant for a programming language, may be trusted.

If the next code is not trusted at block 405, the processing logic of process 400 may randomly determine whether to morph the next code, for example, based on a proportion of un-trusted code vs. trusted code dynamically tracked. The processing logic of process 400 may selectively perform randomization operations to randomize or morph the next code to allow non-deterministic adjustment of amount of randomization in an emitted code stream for improving execution performance of a randomized compiled code. For example, the higher the proportion of un-trusted code, the more likely the next code may be randomized.

At block 407, if a next code is selected for randomization, the processing logic of process 400 may perform one or more randomization operations on the next code to hide potential un-trusted executable instructions embedded in the next code. A randomization operation may be a constant blinding operation, NOP padding operation, instruction randomizing operations, or other suitable operations for the next code. The processing logic of process 400 may emit the randomized code to a code stream for execution at block 409.

FIGS. 5A-5B illustrate examples of just-in-time compilation with scattered randomization operations according to certain embodiments described herein. Turning now to FIG. 5A, code block (or instruction) 501 may include un-trusted constant value 1. A randomization operation, such as constant blinding operation may be selectively applied to randomize or morph code block 501 into code block 503 using an arbitrary number 57382 to perform the same function as block 501. Potential hidden executable instructions embedded via un-trusted value 1 in code block 501 may be prevented from being executed in code block 503.

Example 500B describes exemplary operations to selectively randomize compiled code to introduce predictability in a cost effective manner. At 505, a heuristic measure is calculated for a proportion of un-trusted content vs. trusted content based on a total number (or bytes) of un-trusted values and a total number of trusted values currently encountered in a compiled code stream. At 507, a random selection is performed to determine whether to apply random operations to randomize a code (or harden a value) to be emitted. In one embodiment, as the proportion of un-trusted content becomes higher, the likelihood of randomizing the code may increase. By involving a random number at 507, the selection operation, and thus, the emitted compiled code, may become non-deterministic or unpredictable.

In some embodiments, a proportion of un-trusted code may be estimated to indicate a ratio of un-trusted code size and a total size of the code (both trusted and un-trusted) currently encountered. Function randomNumber at 507 may return a random value between 0 and 1. In one embodiment, if the ratio indicated and the random value returned satisfy a certain relationship (e.g. the ratio indicated being greater than the random value returned adjusted by a configurable setting), the current un-trusted code may be hardened (or randomized). Thus, the higher the proportion of un-trusted code, the more likely the current un-trusted code may be hardened for emission.

In one embodiment, function emit (e.g. at 509) may pass a byte through to an instruction stream without modification. Function emitHardenedValue at 511 may perform one or more randomization operations to harden the value being emitted. The randomization operations applied may not be predictable by an attacker. Function decayUntrustedByteCount at 513 may apply a decay factor to adjust (e.g. dynamically reduce) the total number of un-trusted values encountered (e.g. untrustedBytes).

Example 500B may include configurable parameters or functions based on heuristically determined environmental settings (e.g. based on where a source code is received from, which version of hosting operating system, user inputs or other applicable settings) to adjust, for example, attacker protection effectiveness vs code execution efficiency. For example, decay factor at 513 may be applied to prevent penalizing all large pieces of code, as potential hidden un-trusted code planted by an attacker may have already been broken after emitting a harden value. Without applying the decay factor (e.g. decayUntrustedByteCount), operations in example 500B may eventually enter a state where almost all values of the compiled code are hardened. Similarly, rapid decay of the total number of un-trusted values may result in sufficiently large streams of unhardened values for an attacker to mount a successful attack. Thus, decayUntrustedByteCount at line 513 may apply a decay factor that has been determined appropriate for the target environment, e.g. via EnviornmentSafetyHeuristic at 507 for the environmental settings.

In some embodiments, environmental settings can affect non-deterministic decision (or selection) as to whether to harden an un-trusted code for emission. For example, random value returned by randomNumber may be updated by EnviornmentSafetyHeuristic 507 to change the likelihood that a proportion of un-trusted code and the random value can satisfy a relationship to randomize current un-trusted code for emission. If the environment is safe (e.g. a secure host, or a verified source code etc.), the environmental settings may cause a decrease, for example, in the likelihood that the relationship would be satisfied and vice versa.

Figure 6:
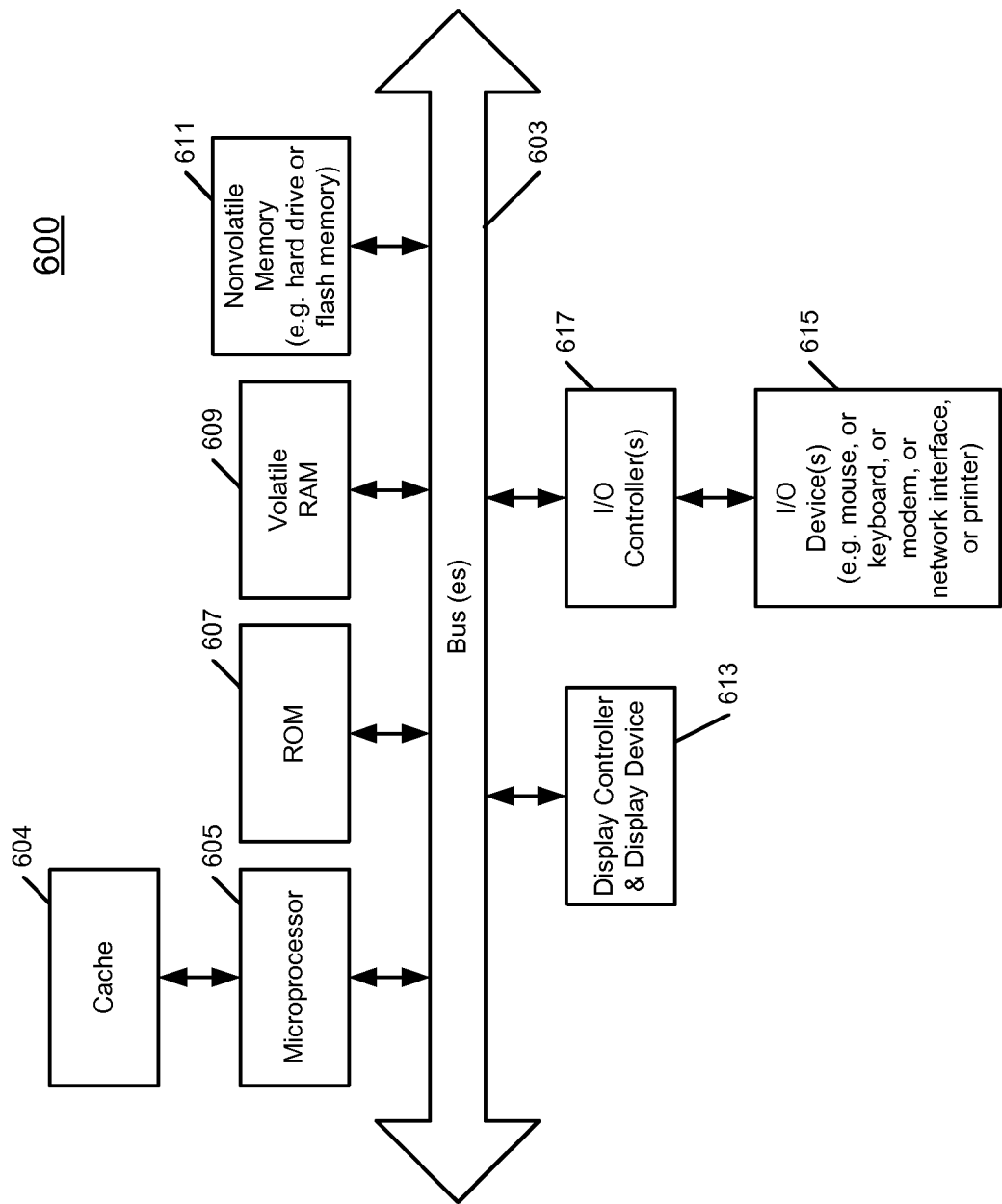
FIG. 6 illustrates one example of a data processing system such as a computer system, which may be used in conjunction with the embodiments described herein.

FIG. 6 shows one example of a data processing system, such as a computer system, which may be used with one embodiment the present invention. For example, system 2 of FIG. 2 may be implemented as a part of the system shown in FIG. 6. Note that while FIG. 6 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 6, the computer system 600, which is a form of a data processing system, includes a bus 603 which is coupled to a microprocessor(s) 605 and a ROM (Read Only Memory) 607 and volatile RAM 609 and a non-volatile memory 611. The microprocessor 605 may retrieve the instructions from the memories 607, 609, 611 and execute the instructions to perform operations described above. The bus 603 interconnects these various components together and also interconnects these components 605, 607, 609, and 611 to a display controller and display device 613 and to peripheral devices such as input/output (I/O) devices which may be mice, keyboards, modems, network interfaces, printers and other devices which are well known in the art. Typically, the input/output devices 615 are coupled to the system through input/output controllers 617. The volatile RAM (Random Access Memory) 609 is typically implemented as dynamic RAM (DRAM) which requires power continually in order to refresh or maintain the data in the memory.

The mass storage 611 is typically a magnetic hard drive or a magnetic optical drive or an optical drive or a DVD RAM or a flash memory or other types of memory systems which maintain data (e.g. large amounts of data) even after power is removed from the system. Typically, the mass storage 611 will also be a random access memory although this is not required. While FIG. 6 shows that the mass storage 611 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface or wireless networking interface. The bus 603 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A machine-readable non-transitory storage medium having instructions therein, which when executed by a machine, cause the machine to perform a method, the method comprising:

providing a source code specifying operations in a programming language, wherein machine instructions are executable to perform the operations specified in the source code, the source code to be compiled into a compiled code, wherein a portion of the compiled code has been generated from the machines instructions, wherein a next portion of the compiled code is to be generated from a code block of the machine instructions;

dynamically determining indicators indicating likelihood of trustworthiness of the code block;

randomly determining whether to select the code block for randomization according to the indicators;

randomizing, if the code block is selected for randomization, the code block to generate a randomized compiled code for the next portion of the compiled code, wherein the code block is randomized before completion of the compilation of the source code; and executing the compiled code to perform the operations.

2. The medium of claim 1, wherein the compiled code includes a plurality of code units and wherein the determining comprises:

designating each code unit as either trusted or un-trusted when the source code is being compiled.

3. The medium of claim 2, further comprising:

maintaining amount of trusted code and amount of untrusted code separately indicating total size of trusted code units and total size of un-trusted code units that have been compiled from the source code, wherein the indicators include the trusted code size and the un-trusted code size.

4. The medium of claim 3, wherein the indicators include a ratio between the amount of trusted code and the amount of un-trusted code.

5. The medium of claim 3, wherein the amount of un-trusted code is related to the total size of un-trusted code units via a decay factor, and wherein the decay factor is dynamically applied to reduce the total size of un-trusted code units for the amount of un-trusted code during compilation of the source code.

6. The medium of claim 1, wherein one of the indicators represents a proportion of un-trusted content encountered in the source code during the compilation of the source code, the determining comprises:

comparing the one indicator with a dynamic random value during the compilation, wherein the one indicator is no less than the dynamic random value if the code block is selected for randomization.

7. The medium of claim 6, wherein the dynamic random value is non-predictably generated via a function of an environmental setting representing a level of safety for the source code, and wherein the higher the level of safety, the less likely the one indicator is no less than the dynamic random value when compared.

8. The medium of claim 7, wherein the setting is heuristically configured based on location of the source code.

9. The medium of claim 1, further comprising:
applying randomization operations to randomize the machine instructions, wherein the randomization operations introduce unpredictable instructions in the randomized compiled code.

10. The medium of claim 9, wherein the randomization operations include constant blinding operations.

11. A machine-readable non-transitory storage medium having instructions therein, which when executed by a machine, cause the machine to perform a method, the method comprising:
providing a source code specifying operations in a programming language, wherein machine instructions are executable to perform the operations specified in the source code; and
emitting a code stream as compiled code for compiling the source code based on the machine instructions, wherein a portion of the compiled code has been emitted, wherein a next portion of the compiled code is to be emitted from a next code of the machine instructions, the code stream having an amount of randomization to protect against execution of potential un-trusted executable instructions embedded via the source code, wherein the emitting the code stream comprises:
determining if the next code from the machine instructions is trusted or not,
if the next code is not trusted, randomly determining whether to select the next code for randomization to allow adjustment of the amount of randomization in the code stream,
if the next code is selected for randomization, performing randomization operations on the next code to introduce additional randomness to the code stream, wherein the randomization operations are performed on the next code before completion of the compilation of the source code, and
emitting the randomized next code to the code stream for execution.

12. The medium of claim 11, wherein the next code represents a value specified in the source code and wherein the next code is un-trusted if the source code is received from an unverified source.

13. The medium of claim 11, wherein the source code is compiled via a compiler and wherein the next code is trusted if the next code represents a value created by the compiler.

14. The medium of claim 13, wherein the source code is retrieved from a remote device and wherein the compiler is a just in time compiler to generate the code stream during runtime.

15. The medium of claim 11, wherein the selection is based on heuristic indicators including a proportion of amount of un-trusted code vs amount of trusted code in an already emitted portion of the code stream, and wherein the proportion is dynamically tracked during emission of the code stream.

16. The medium of claim 15, wherein the heuristic indicators are associated with environmental settings to allow adjustment between effectiveness of the protection and efficiency of execution of the code stream.

17. The medium of claim 16, wherein the environmental settings specify a degree of susceptibility to security attacks to execute the code stream.

18. The medium of claim 16, wherein the heuristic indicators include a decay factor configured according to the environmental settings, and wherein the amount of un-trusted code represents number of bytes in the un-trusted code dynamically adjusted by the decay factor to prevent penalizing code sized with a large number of bytes.

19. The medium of claim 16, wherein the heuristic indicators include a dynamically generated random value, and wherein the next code is selected if the proportion and the dynamically generated random value satisfy a particular relationship.

20. The medium of claim 19, wherein the dynamically generated random value is associated with the environmental settings to adjust likelihood of the selection of the next code for randomization.

21. The medium of claim 11, wherein the randomization operations include constant blinding operations.

22. A computer implemented method comprising:
providing a source code specifying operations in a programming language, wherein machine instructions are executable to perform the operations specified in the source code, the source code to be compiled into an compiled code, wherein a portion of the compiled code has been generated from the machines instructions, wherein a next portion of the compiled code is to be generated from a code block of the machine instructions;
dynamically determining indicators indicating likelihood of trustworthiness of the code block;
randomly determining whether the code block is selected for randomization according to the indicators;
randomizing, if the code block is selected for randomization, the code block to generate a randomized compiled code for the next portion of the compiled code, wherein the code block is randomized before completion of the source code; and
executing the compiled code to perform the operations.

23. A computer system comprising:
a memory storing executable instructions;
an interface to dynamically fetch a source code; and
a processor coupled to the memory and the interface to execute the instructions, the processor being configured to:
provide a source code specifying operations in a programming language, wherein machine instructions are executable to perform the operations specified in the source code, the source code to be compiled into a compiled code, wherein a portion of compiled code has been generated from the machines instructions, wherein a next portion of the compiled code is to be generated from a code block of the machine instructions,
dynamically determine indicators indicating likelihood of trustworthiness of the code block,
randomly determine whether to select the code block for randomization according to the indicators,
randomize, if the code block is selected for randomization, the code block to generate a randomized compiled code for the next portion of the compiled code, wherein the code block is randomized before completion of the compilation of the source code, and
execute the compiled code to perform the operations.

* * * * *